(12) United States Patent
Guo et al.

(10) Patent No.: US 8,941,775 B2
(45) Date of Patent: Jan. 27, 2015

(54) SYSTEMS, METHODS, AND DEVICES FOR FLASH EXPOSURE CONTROL USING PREFLASH STATISTICS

(71) Applicant: Apple Inc., Cupertino, CA (US)

(72) Inventors: Haitao Guo, San Jose, CA (US); David Daming Kuo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/247,505

(22) Filed: Apr. 8, 2014

(65) Prior Publication Data

US 2014/0285709 A1 Sep. 25, 2014

Related U.S. Application Data

(62) Division of application No. 12/792,916, filed on Jun. 3, 2010, now Pat. No. 8,730,384.

(51) Int. Cl.
H04N 9/68 (2006.01)
H04N 5/235 (2006.01)

(52) U.S. Cl.
CPC .................. H04N 5/2354 (2013.01)
USPC ......... 348/372; 348/221.1; 348/234; 348/362

(58) Field of Classification Search
USPC ............... 348/221.1, 234, 362, 372
See application file for complete search history.

(56) References Cited

U.S. PATENT DOCUMENTS

| 7,002,624 | B1 | 2/2006 | Uchino et al. |
|---|---|---|---|
| 7,199,831 | B2 | 4/2007 | Nonaka |
| 7,667,766 | B2 | 2/2010 | Lee et al. |
| 2006/0033835 | A1 | 2/2006 | Pollard et al. |
| 2006/0050335 | A1 | 3/2006 | Dorrell et al. |
| 2009/0086085 | A1 | 4/2009 | Asoma |
| 2009/0160944 | A1 | 6/2009 | Trevelyan et al. |
| 2009/0180022 | A1 | 7/2009 | Kwon et al. |
| 2009/0206235 | A1 | 8/2009 | Guan et al. |
| 2010/0074610 | A1 | 3/2010 | Trevelyan |

Primary Examiner — Anthony J Daniels
(74) Attorney, Agent, or Firm — Blakely, Sokoloff, Taylor & Zafman LLP

(57) ABSTRACT

Systems, methods, and devices for obtaining a properly exposed strobe-illuminated image are provided. One method for doing so may include, for example, gathering image capture statistics during a first period when a strobe is not emitting light and during a second period when the strobe emits a preflash. These image capture statistics may include distinct image capture control statistics and luma values associated with the periods. Final image capture control statistics then may be determined based at least in part on the first luma value normalized to the first image capture control statistics and the second luma value normalized to the second image capture control statistics. Thereafter, the final image capture control statistics may be used to capture a properly exposed strobe-illuminated image when the strobe emits a main flash.

12 Claims, 9 Drawing Sheets

SYSTEMS, METHODS, AND DEVICES FOR FLASH EXPOSURE CONTROL USING PREFLASH STATISTICS

This application is a divisional of co-pending U.S. patent application Ser. No. 12/792,916, filed on Jun. 3, 2010.

BACKGROUND

The present disclosure relates generally to strobe-illuminated image capture and, more particularly, to controlling such image capture exposure using preflash statistics.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices commonly include cameras or other image capture circuitry. Such image capture circuitry may capture photos based on light illuminating a scene. In certain low-light conditions, ambient light alone may not sufficiently illuminate a scene and resulting images of such scenes may be dark or underexposed.

To improve image capture under such low-light conditions, many electronic devices also may include a strobe flash illumination device, such as a xenon or light emitting diode (LED) flash. These strobe flashes may supplement the ambient light illuminating the scene. However, the actual effect of the supplemental illumination on the scene may not be observed by image capture circuitry of an electronic device until it occurs. Thus, if the amount of illumination provided by the flash is too high or too low relative to the image capture control statistics used to capture the image, the image may not be properly exposed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for obtaining a properly exposed strobe-illuminated image. One method for doing so may include, for example, gathering image capture statistics during a first period when a strobe is not emitting light and during a second period when the strobe emits a preflash. These image capture statistics may include distinct image capture control statistics and luma values associated with the periods. Final image capture control statistics then may be determined based at least in part on the first luma value normalized to the first image capture control statistics and the second luma value normalized to the second image capture control statistics. Thereafter, the final image capture control statistics may be used to capture a properly exposed strobe-illuminated image when the strobe emits a main flash.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
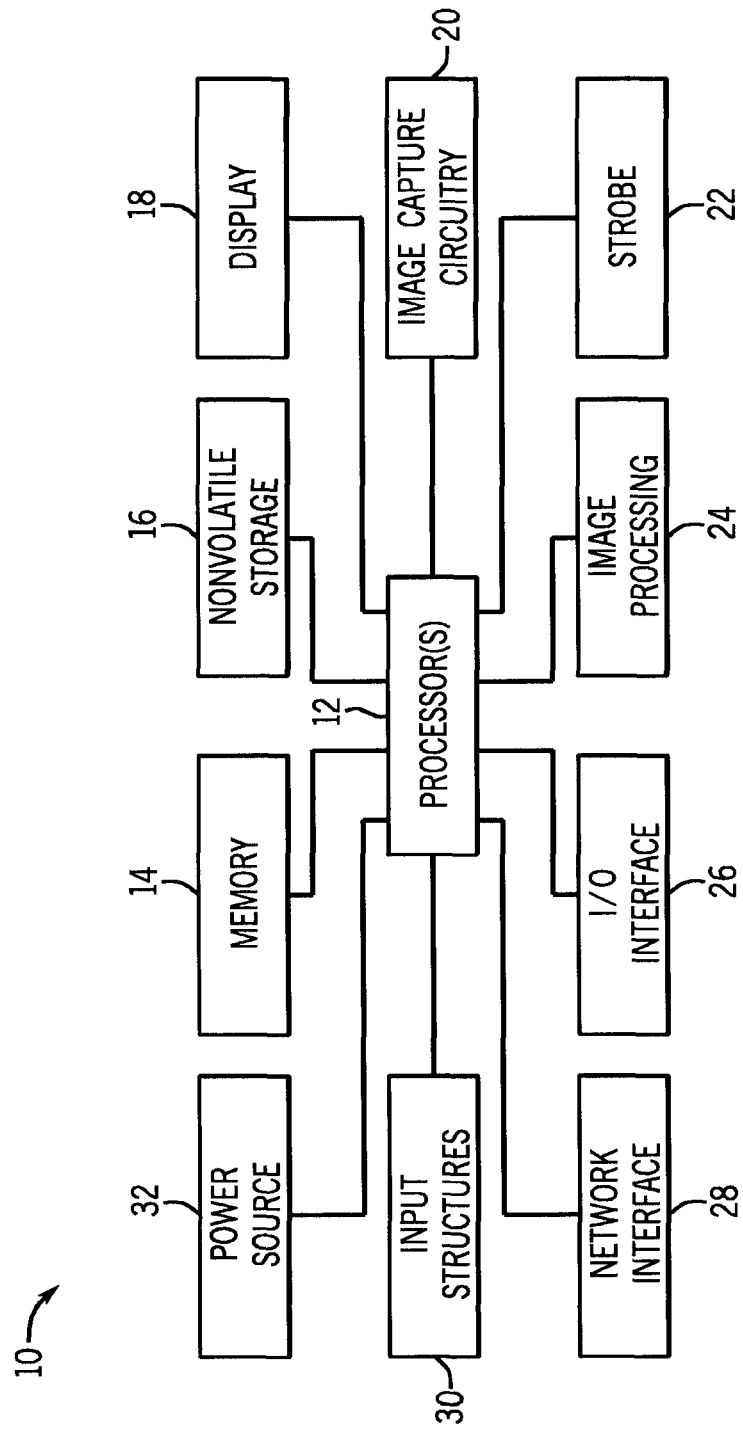
FIG. 1 is a block diagram of an electronic device capable of performing the techniques disclosed herein, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments involve determining image capture control statistics (e.g., exposure time, analog and digital gain values, and so forth) and/or strobe intensity for controlling image capture when a strobe is used to illuminate a scene. In particular, as noted above, the actual effect of a strobe flash on a scene may not be observed by image capture circuitry of an electronic device until it occurs. As such, the electronic device may estimate the effect of the strobe flash on the scene and may determine the image capture control statistics before a "main flash" of the strobe occurs. These image capture control statistics may be determined so as to avoid overexposure or underexposure of the image captured.

The electronic device may determine the image capture control statistics and/or strobe intensity using certain image capture statistics (e.g., the image capture control statistics, average luma or brightness value, and so forth) relating to image data obtained from the image capture circuitry during a "strobe off" period (when the strobe is not emitting light) and a "preflash" period (when the strobe is emitting a "preflash" amount of light). Based at least partly on these certain image capture statistics associated with the "strobe off" and the "preflash" periods, the electronic device may extrapolate certain "main flash" image capture statistics that are expected to occur during a "main flash" of the strobe. The electronic device may use these extrapolated "main flash" image capture statistics to determine "main flash" image capture control statistics, which the electronic device may use to control the image capture circuitry when the strobe emits the "main flash."

It should be noted that the image capture statistics gathered from the "strobe off" and "preflash" periods may reflect the results of any suitable autoexposure (AE) algorithm that freely selects appropriate image capture control statistics for obtaining image data during the "strobe off" and "preflash" periods. That is, the AE algorithm may not force the image capture control statistics to be identical during both the "strobe off" and "preflash" periods. Although forcing identical image capture control statistics would allow certain image capture statistics (e.g., luma) to be directly comparable, doing so might also cause the "strobe off" or "preflash" image data to be improperly exposed or to be obtained at a lower quality.

Since the AE algorithm may freely choose the image capture control statistics during the "strobe off" and "preflash" periods, certain image capture statistics (e.g., luma) from the "strobe off" and "preflash" may depend on the image capture control statistics respectively used during the "strobe off" and "preflash" periods. In other words, the image capture statistics of "strobe off" and "preflash" periods may not be directly compared because of their dependencies on these control statistics. For example, an average luma value associated with the "strobe off" period may reflect not only the amount of ambient light illuminating a scene, but also the particular image capture control statistics used to capture image data during the "strobe off" period. Similarly, the average luma value associated with the "preflash" period may reflect not only the cumulative effect of ambient light and the "preflash" amount of light onto the scene, but also the particular image capture control statistics used to capture image data during the "preflash" period.

Accordingly, in certain embodiments, the electronic device may normalize certain image capture statistics, such as average luma values, to the image capture control statistics respectively associated with their capture. These normalized luma values now may be directly compared, and may be used to extrapolate an expected luma value that would be obtained with a main strobe flash image capture using initial values of "main flash" image capture control statistics. Based on the extrapolated luma value, the electronic device may adjust the initial values of the "main flash" image capture control statistics to achieve a properly exposed image when the main flash occurs. A normalized extrapolated luma value also may be used to calibrate an auto white balance (AWB) of the strobe-illuminated image.

The electronic device may adjust the initial values of the "main flash" image capture control statistics depending on whether the image that would result is likely to be overexposed or underexposed. If the resulting image is likely to be underexposed, the control statistics may be adjusted to increase an analog gain and, if necessary, an image signal processor (ISP) digital gain. If the image is likely to be overexposed, certain of the control statistics may be reduced in a certain order until a likely proper exposure is expected. By way of example, a sensor digital gain may be reduced first. If the main flash image is still expected to be overexposed, the analog gain may be reduced. If the image is expected still to be overexposed, the exposure time may be reduced, and if the image yet still is expected to be overexposed, the intensity of the main flash output by the strobe may be reduced. After the "main flash" image capture control statistics have been determined, a "main flash" image capture sequence may begin and a final strobe-illuminated image may be captured while the strobe emits the main flash.

Figure 2:
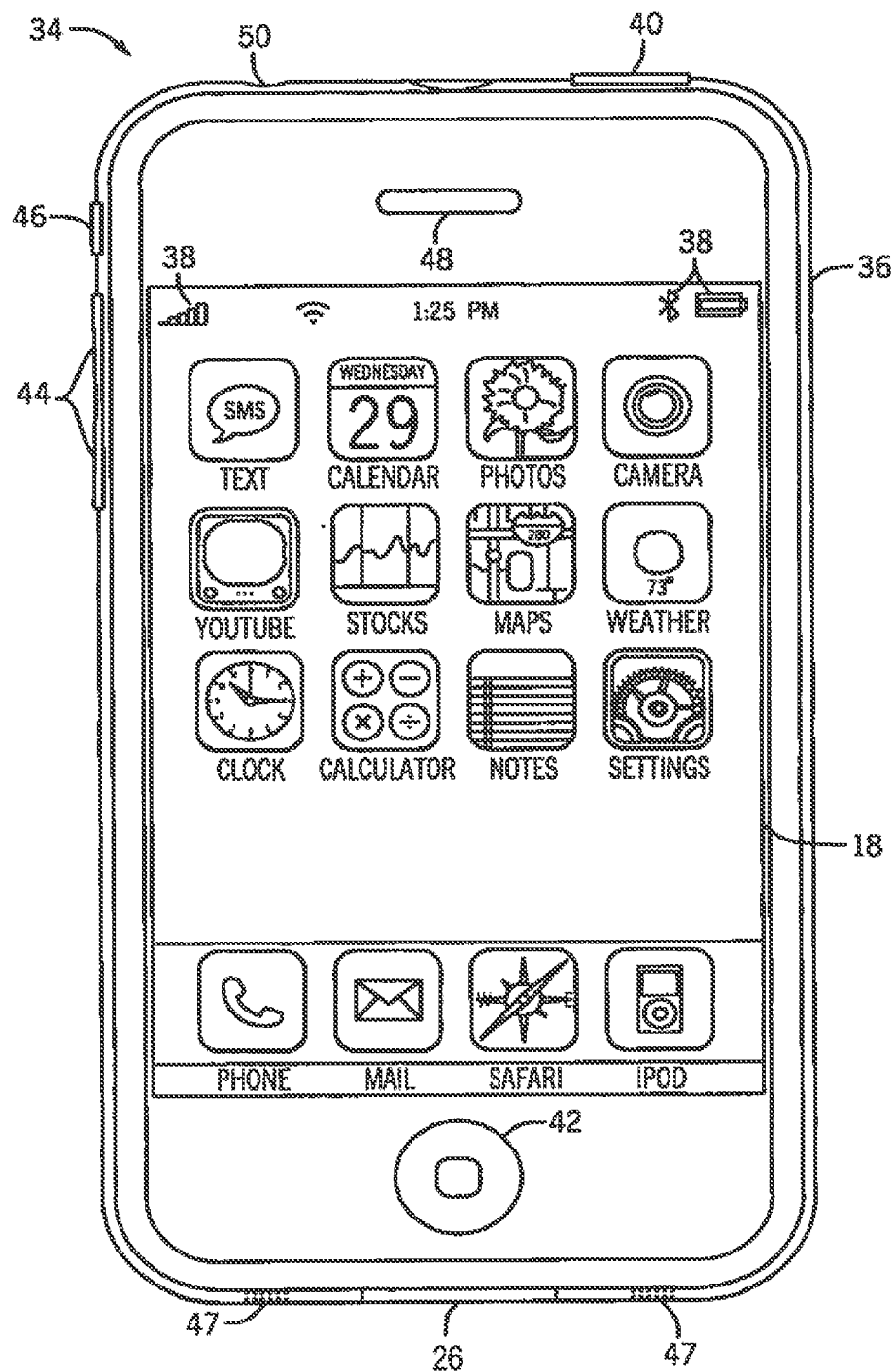
FIGS. 2 and 3 respectively represent front and back views of a handheld electronic device representing an embodiment of the electronic device of FIG. 1.
Figure 3:
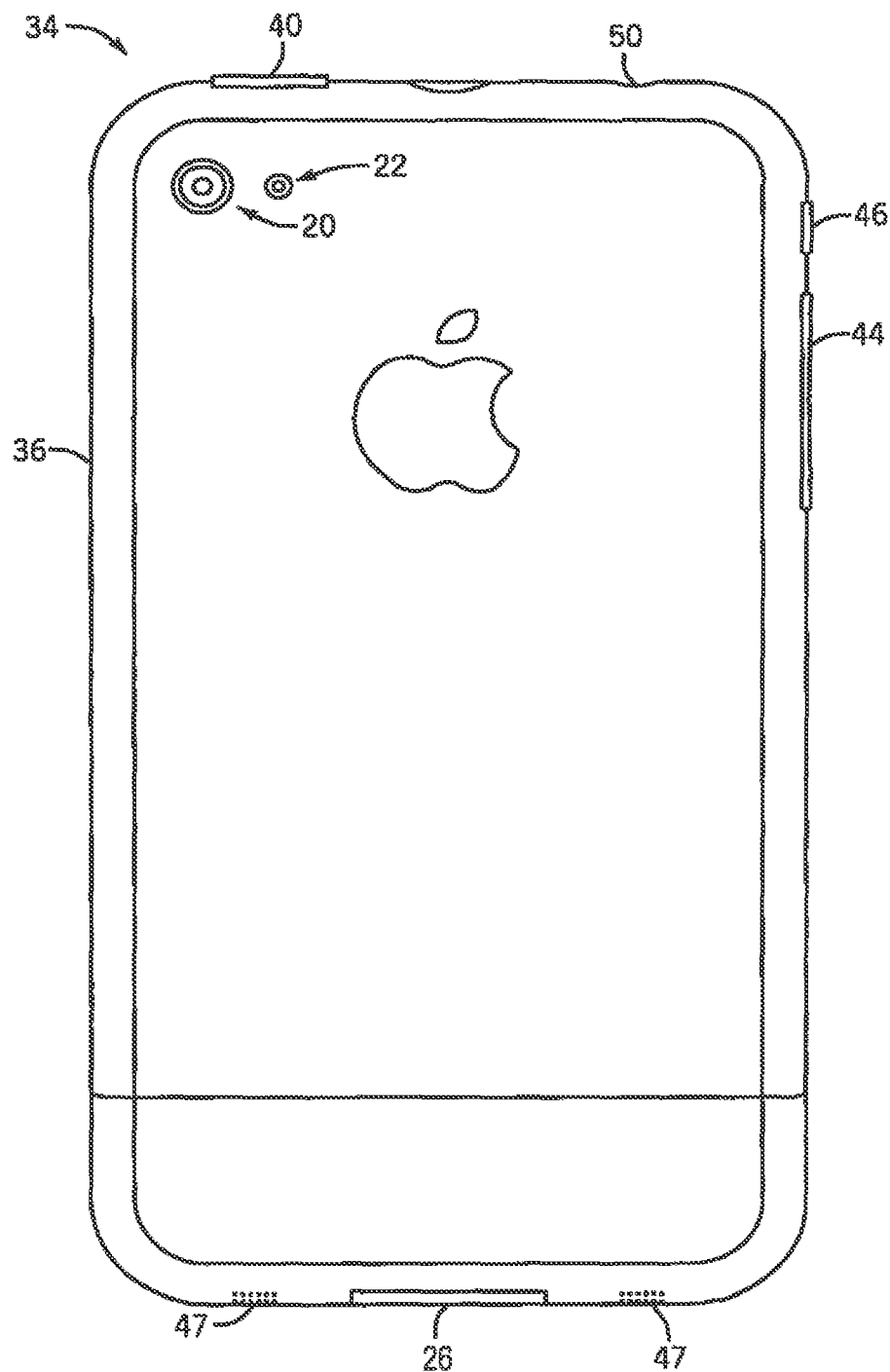

With the foregoing in mind, a general description of suitable electronic devices for performing the presently disclosed techniques is provided below. In particular, FIG. 1 is a block diagram depicting various components that may be present in an electronic device suitable for use with the present techniques. FIGS. 2 and 3 represent front and back views of a suitable electronic device, which may be, as illustrated, a handheld electronic device having image capture circuitry and a strobe.

Turning first to FIG. 1, an electronic device 10 for performing the presently disclosed techniques may include, among other things, one or more processor(s) 12, memory 14, nonvolatile storage 16, a display 18, image capture circuitry 20, a strobe 22, image processing 24, an input/output (I/O) interface 26, network interfaces 28, input structures 30, and a power source 32. The various functional blocks shown in FIG. 1 may include hardware elements (including circuitry), software elements (including computer code stored on a computer-readable medium) or a combination of both hardware and software elements. It should further be noted that FIG. 1 is merely one example of a particular implementation and is intended to illustrate the types of components that may be present in electronic device 10.

By way of example, the electronic device 10 may represent a block diagram of the handheld device depicted in FIG. 2 or similar devices. Additionally or alternatively, the electronic device 10 may represent a system of electronic devices with certain characteristics. For example, a first electronic device may include image capture circuitry 20, image processing 24, processor(s) 12, and/or other data processing circuitry, and a second electronic device in communication with the first electronic device may include a strobe 22. It should be noted that the image processing 24 block, the processor(s) 12, and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within electronic device 10. The data processing circuitry also may be partially embodied within electronic device 10 and partially embodied within another electronic device connected to device 10. Finally, the data processing circuitry may be wholly implemented within another device wired or wirelessly connected to device 10.

In the electronic device 10 of FIG. 1, the processor(s) 12 and/or other data processing circuitry may be operably coupled with the memory 14 and the nonvolatile memory 16 to perform various algorithms for carrying out the presently disclosed techniques. Such programs or instructions executed by the processor(s) 12 may be stored in any suitable article of manufacture that includes one or more tangible, computer-readable media at least collectively storing the instructions or routines, such as the memory 14 and the nonvolatile storage 16. Also, programs (e.g., an operating system) encoded on such a computer program product may also include instructions that may be executed by the processor(s) 12 to enable the electronic device 10 to provide various functionalities, including those described herein. The display 18 may be a touch-screen display, which may enable users to interact with a user interface of the electronic device 10.

The image capture circuitry 20, the strobe 22, and the image processing 24 may cooperate to produce a strobe-illuminated image. Specifically, as discussed below, the image capture circuitry 20 may collect image data during a "strobe off" period (when the strobe 22 is not emitting light) and during a "preflash" period (when the strobe 22 is emitting a "preflash" amount of light). The image processing 24, which may represent an image signal processor (ISP), such as those available from Samsung, and/or other data processing circuitry (e.g., the processor(s) 12), may gather image capture statistics regarding the image data from the "strobe off" and "preflash" periods. Data processing circuitry of the electronic device, which may be associated with the image capture circuitry 20, the image processing 24, and/or the processor(s) 12, may determine "main flash" image capture control statistics based on the "strobe off" and "preflash" image capture statistics. Thereafter, the strobe 22 may emit a "main flash" amount of light and the image capture circuitry 20 may capture a strobe-illuminated image based on the "main flash" image capture control statistics. The strobe 22 may include any suitable light source, such as xenon bulbs or light emitting diodes (LEDs).

The I/O interface 26 may enable electronic device 10 to interface with various other electronic devices, as may the network interfaces 28. The network interfaces 28 may include, for example, interfaces for a personal area network (PAN), such as a Bluetooth network, for a local area network (LAN), such as an 802.11x Wi-Fi network, and/or for a wide area network (WAN), such as a 3G cellular network. Through the network interfaces 28, the electronic device 10 may interface with other devices that may include a strobe 22. The input structures 30 of the electronic device 10 may enable a user to interact with the electronic device 10 (e.g., pressing a button to initiate an image capture sequence). The power source 32 of the electronic device 10 may be any suitable source of power, such as a rechargeable lithium polymer (Li-poly) battery and/or an alternating current (AC) power converter.

FIGS. 2 and 3 depict front and back views of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 26 may open through the enclosure 36 and may include, for example, a proprietary I/O port from Apple Inc. to connect to external devices. As indicated in FIG. 3, the reverse side of the handheld device 34 may include the image capture circuitry 20 and the strobe 22.

User input structures 40, 42, 44, and 46, in combination with the display 18, may allow a user to control the handheld device 34. For example, the input structure 40 may activate or deactivate the handheld device 34, the input structure 42 may navigate a user interface to a home screen, a user-configurable application screen, and/or activate a voice-recognition feature of the handheld device 34, the input structures 44 may provide volume control, and the input structure 46 may toggle between vibrate and ring modes. A microphone 47 may obtain a user's voice for various voice-related features, and a speaker 48 may enable audio playback and/or certain phone capabilities. Headphone input 50 may provide a connection to external speakers and/or headphones.

Figure 4:
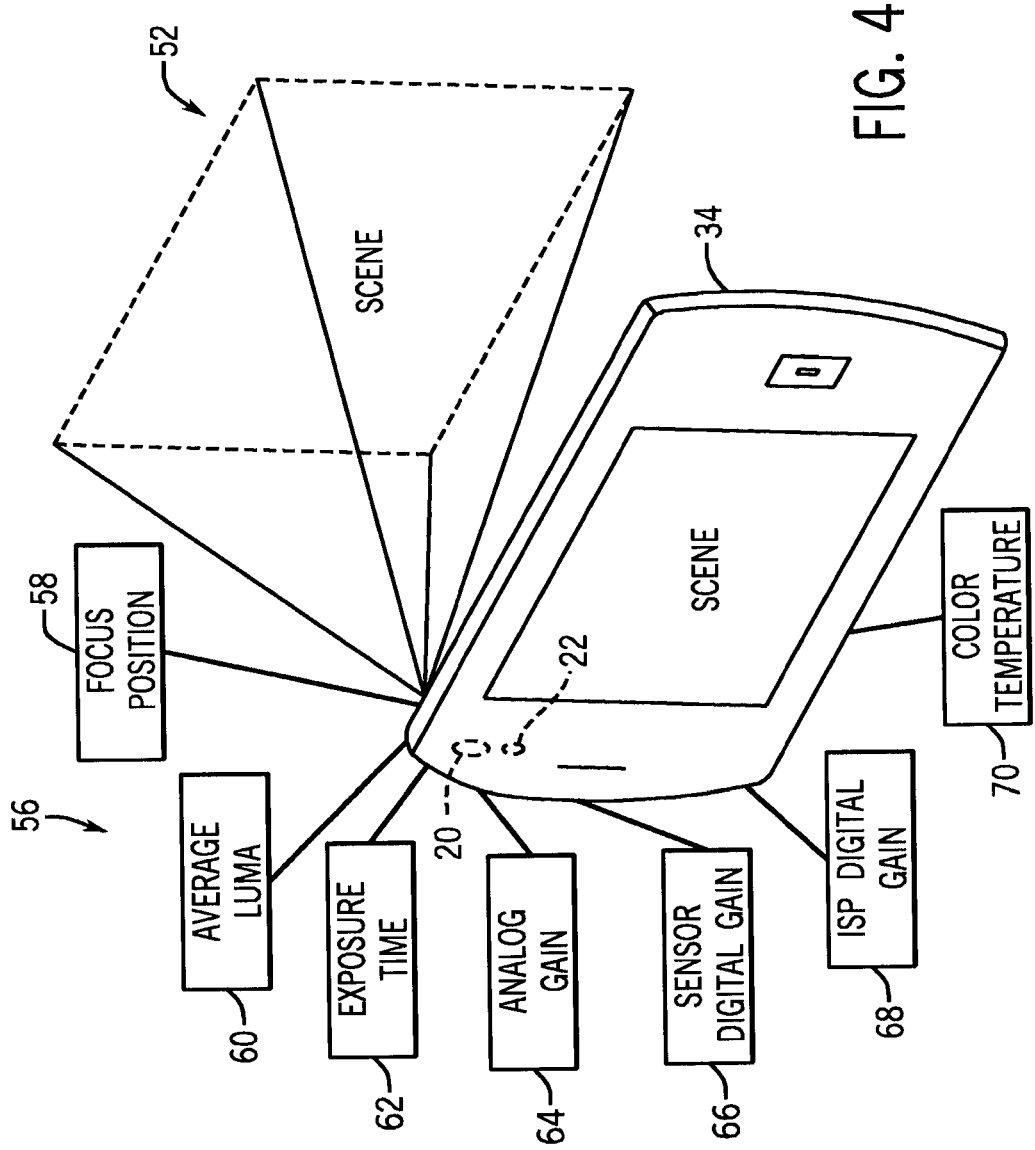
FIG. 4 is a schematic diagram representing various image capture statistics associated with an image capture sequence, in accordance with an embodiment.

When an electronic device 10, such as the handheld device 34, is used to capture an image, the image capture circuitry 20 and/or image processing 24 may generate various image capture statistics associated with image data being captured. FIG. 4 schematically illustrates such image capture statistics, which may be obtained by the handheld device 34 while capturing image data from a scene 52. As discussed below, these image capture statistics may include image capture control statistics, which may be used for controlling the manner in which the image capture circuitry 20 captures image data, as well as statistics relating to the scene 52.

When the image capture circuitry 20 captures image data relating to the scene 52, the image processing 24 and/or other data processing circuitry may determine certain image capture statistics 56 relating to this image data. For example, among other things, such image capture statistics 56 may include a focus position 58, an average luma 60, an exposure time 62, an analog gain 64, a sensor digital gain 66, an image signal processor (ISP) digital gain 68, and/or a color temperature 70. In general, the image processing 24 and/or the data processing circuitry may use certain of these image capture control statistics to control the image capture circuitry 20 to obtain a properly exposed image.

Of the image capture statistics 56, the focus position 58 may be determined when the image processing 24, other data processing circuitry, and/or the image capture circuitry 20 performs an autofocus (AF) algorithm. It should be appreciated that any suitable AF algorithm may be used to determine the focus position 58. Also, as discussed below, the image processing 24 and/or other data processing circuitry may determine both "preflash" and "main flash" illumination intensities for the strobe 22 based at least partly on the focus position 58. Similarly, the color temperature 70 may represent a color temperature associated with ambient light of the scene 52. As discussed below, an auto white balance (AWB) algorithm may use the color temperature 70 of the scene 52 when the strobe is not emitting light in determining a correct white balance when the "main flash" is strobe is emitted.

The average luma 60 represents an average gray value or brightness associated with the scene 52, as captured based on certain image capture control statistics and as noted below. As such, the average luma 60 may vary depending on both the illumination of the scene 52 (e.g., ambient light and/or strobe intensity) and the particular image capture control statistics used by the image capture circuitry 20 to capture image data of the scene 52.

The exposure time 62, the analog gain 64, the sensor digital gain 66, and the image signal processor (ISP) digital gain 68 may represent such image capture control statistics for controlling the image capture circuitry 20. It should be appreciated that in some embodiments, more or fewer image capture control statistics may be determined (e.g., iris or aperture, neutral density filter, etc.). These image capture control statistics 62-68 also may be referred to as autoexposure (AE) control statistics, as they may be determined by the image processing 24 and/or other data processing circuitry based on any suitable AE algorithm. Thus, when image data is acquired by the image capture circuitry 20 during a "strobe off" period, the image capture control statistics 62-68 may be different than when image data is acquired during a "preflash" period. As discussed in greater detail below, the image capture circuitry 20 may capture image data during a "main flash" period using image capture control statistics 62-68 determined based at least partly on "strobe off" and "preflash" image capture statistics 56.

Figure 5:
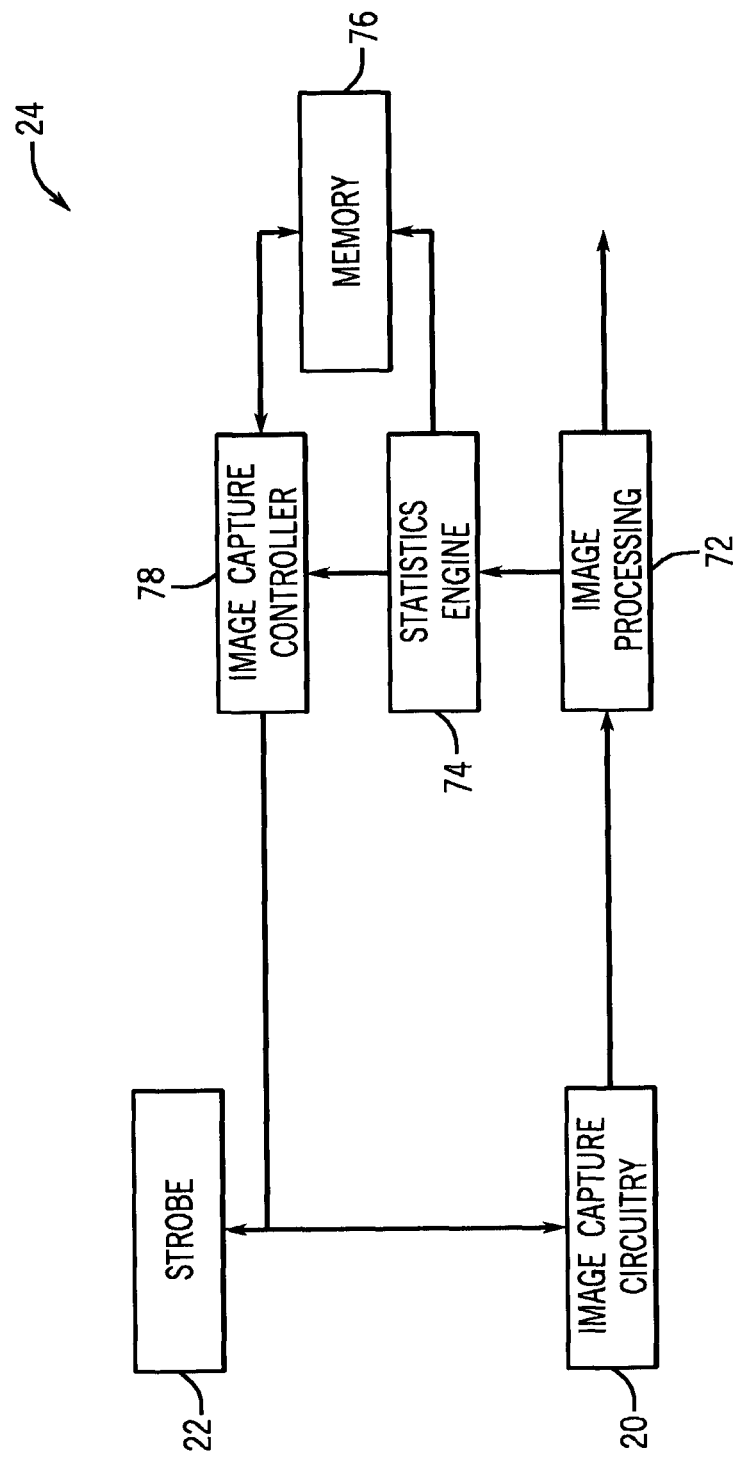
FIG. 5 is a block diagram representing an embodiment of a configuration of image capture circuitry, a strobe flash, and image signal processing in the electronic device of FIG. 1.

One embodiment of a configuration of the image capture circuitry 20, the strobe 22, and the image processing 24 is illustrated in FIG. 5. As shown in FIG. 5, the image capture circuitry 20 may provide image data to an image processing block 72 of the image processing 24. The image processing block 72 may perform certain initial image processing on the image data received from the image capture circuitry 20 before outputting the processed image data to other circuitry of the electronic device 10. In addition, image data with at least some initial image processing from the image processing block 72 may enter a statistics engine 74, which may analyze the image data to determine, among other things, the image capture statistics 56. The image capture statistics may be provided to memory 76 and/or to an image capture controller 78.

Based at least partly on the image capture statistics 56 from the statistics engine 74 and/or the memory 76, the image capture controller 78 may control the image capture circuitry 20 and/or the strobe 22. For example, the image capture controller 78 may control the image capture circuitry 20 according to the image capture control statistics 62-68. In some embodiments, the image capture controller 78 may carry out an autofocus (AF) algorithm in conjunction with the image processing block 72 and the statistics engine 74 to settle on the focus position 58. Similarly, during "strobe off" and "preflash" periods, the image capture controller may carry out an autoexposure (AE) algorithm in conjunction with the image processing block 72 and the statistics engine 74 to settle on the respective exposure times 62, analog gains 64, sensor digital gains 66, and image signal processor (ISP) digital gains 68 associated with the "strobe off" and "preflash" periods.

Figure 6:
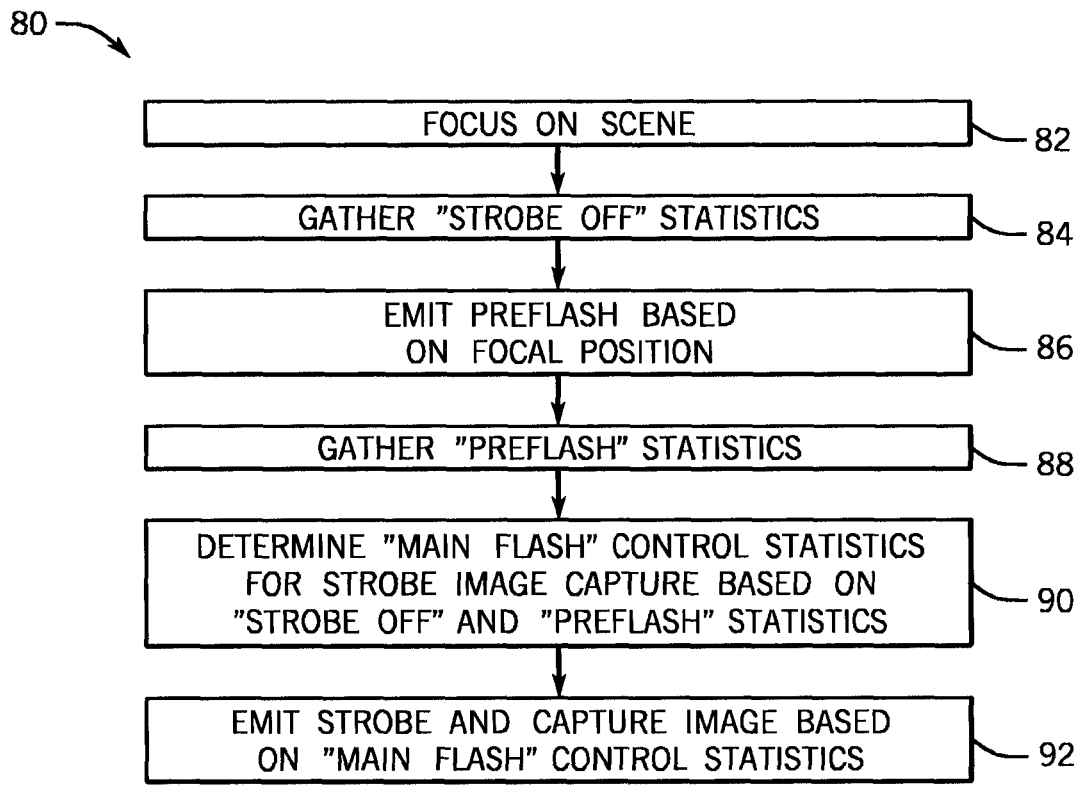
FIG. 6 is a flowchart describing an embodiment of a method for obtaining a properly exposed strobe-illuminated image using statistics captured during a preflash sequence.

As shown by a flowchart 80 of FIG. 6, these and other image capture statistics 56 associated with the "strobe off" and "preflash" periods may be used to determine the ultimate image capture control statistics used by the image capture controller 78 during a "main flash" period. The flowchart 80 for obtaining a properly exposed main-flash-illuminated image may begin when the image capture circuitry 20 focuses on a subject in the scene 52 (block 82). The image capture circuitry 20 may focus on the subject using any suitable technique, including any suitable autofocus (AF) algorithm, as mentioned above. Next, the image capture controller 78 and/or other data processing circuitry (e.g., the processor(s) 12) may gather certain "strobe off" image capture statistics 56 obtained by the statistics engine 74 while the strobe 22 is not emitting light (block 84). These "strobe off" image capture statistics 56 may include, for example, the focus position 58, the average luma 60, the exposure time 62, the analog gain 64, the sensor digital 66, the image signal processor (ISP) digital gain 68, and the color temperature 70.

Based on the focus position 58 gathered at block 84, the image capture controller 78 and/or other data processing circuitry may cause the strobe 22 to emit a "preflash" amount of light onto the scene 52. The "preflash" amount of light may be determined, for example, based on a lookup table or formula relating the focus point 58 to a certain strobe current. In other embodiments, it should be understood that the "preflash" amount of light emitted by the strobe 22 may not depend upon the focus point 58, but may be, for example, a certain constant amount. Generally, in either case, the amount of light emitted at block 86 may be less than the amount of light emitted by the strobe 22 during a "main flash" period, as described below. However, in other embodiments, the amount of light emitted at block 86 may be equal to or more than the amount of light emitted by the strobe 22 during the "main flash" period.

Next, the statistics engine 74 may determine "preflash" image capture statistics 56 using image data obtained by the image capture circuitry 20 while the "preflash" amount of light is being emitted by the strobe 22, certain of which may be gathered by the image capture controller 78 and/or other data processing circuitry (block 88). These certain "preflash" image capture statistics 56 may include, for example, the average luma 60, the exposure time 62, the analog gain 64, the sensor digital gain 66, and the image signal processor (ISP) digital gain 68.

The "strobe off" and "preflash" image capture statistics 56 may be used to extrapolate the impact of a "main flash" strobe illumination on the scene 52, which then may be used to determine certain "main flash" image capture control statistics 62-68 to be employed during a "main flash" period (block 90). In some embodiments, the certain "strobe off" and "preflash" image capture statistics 56 also may be used to determine the intensity of a "main flash" to be emitted by the strobe 22. During a subsequent "main flash" period, the strobe 22 may emit the determined intensity of the "main flash" and may capture an image of the illuminated scene 52 based on the determined "main flash" image capture control statistics 62-68 (block 92). In some embodiments, this "main flash" period may take place after a suitable amount of time has passed since the "preflash" period to reduce red-eye in images of people.

Figure 7:
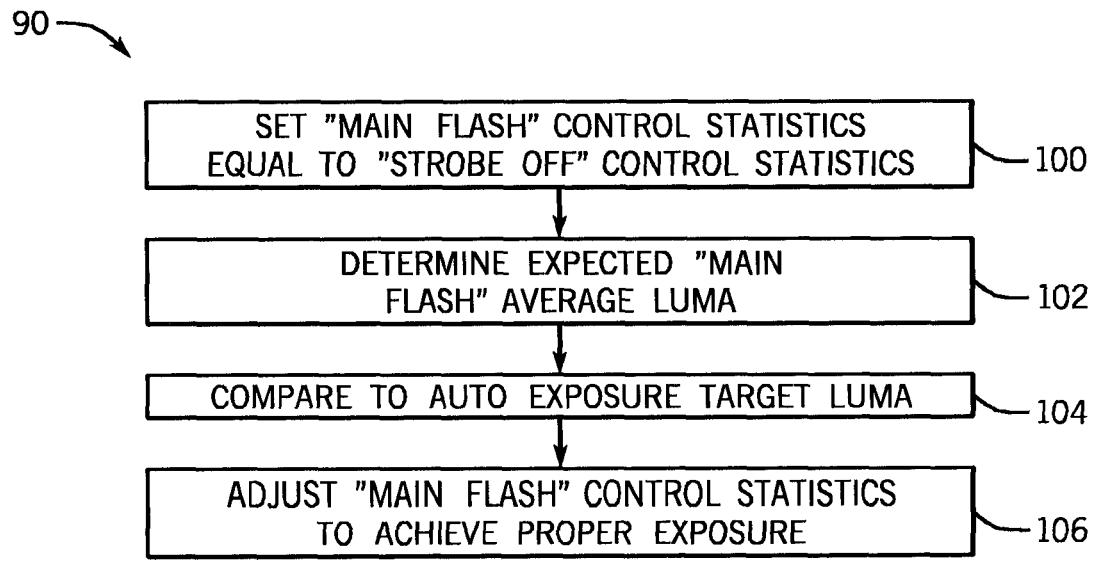
FIG. 7 is a flowchart describing an embodiment of a method for determining image capture control statistics for the proper exposure of a strobe-illuminated image.

As discussed above with reference to block 90 of FIG. 6, the "main flash" image capture control statistics 62-68 may be determined based on the "strobe off" and the "preflash" statistics. FIG. 7 represents a flowchart, also labeled 90, describing an embodiment of a method for performing block 90 of FIG. 6. The flowchart 90 may begin when the "main flash" image capture control statistics 62-68 are set to initial values equal to the "strobe off" image capture control statistics (block 100). That is, the "main flash" image capture control statistics of exposure time 62, analog gain 64, sensor digital gain 66, and ISP digital gain 68 may be initially equal to those values gathered at block 84 of FIG. 6. It should be noted that the "strobe off" image capture control statistics 62-68 may determined by an autoexposure (AE) algorithm when the scene 52 is illuminated exclusively by ambient light. However, additional illumination will be added to the scene 52 by the strobe 22 during the "main flash" period. Thus, without modification, these initial values of the "main flash" image capture control statistics 62-68 could result an image that would be overexposed (or in rare cases underexposed) when the main flash is emitted by the strobe 22 during the "main flash" period. Accordingly, these initial values of the "main flash" image capture control statistics 62-68 may be adjusted to increase or decrease the image data exposure based on the expected impact of the main flash emitted onto the scene 52 by the strobe 22.

To properly adjust the "main flash" image capture control statistics 62-68, the image processing 24 and/or other data processing circuitry may determine an expected "main flash" average luma 60 by extrapolating the "strobe" and "preflash" average luma 60 values (block 102). This expected "main flash" average luma 60 may be compared to a "main flash" autoexposure (AE) target luma amount, which may be higher than a similar "strobe off" target luma amount (block 104). Based on the relationship between the "main flash" AE target luma and the expected "main flash" average luma 60, the image processing 24 and/or other data processing circuitry may ascertain whether the expected final image will be over-exposed or underexposed. The image processing 24 and/or other data processing circuitry thus may obtain the "main flash" image capture control statistics 62-68 by adjusting them until a proper exposure is more likely (block 106). In some embodiments, the image capture control statistics 62-68 may be adjusted in a certain order.

Figure 8A:
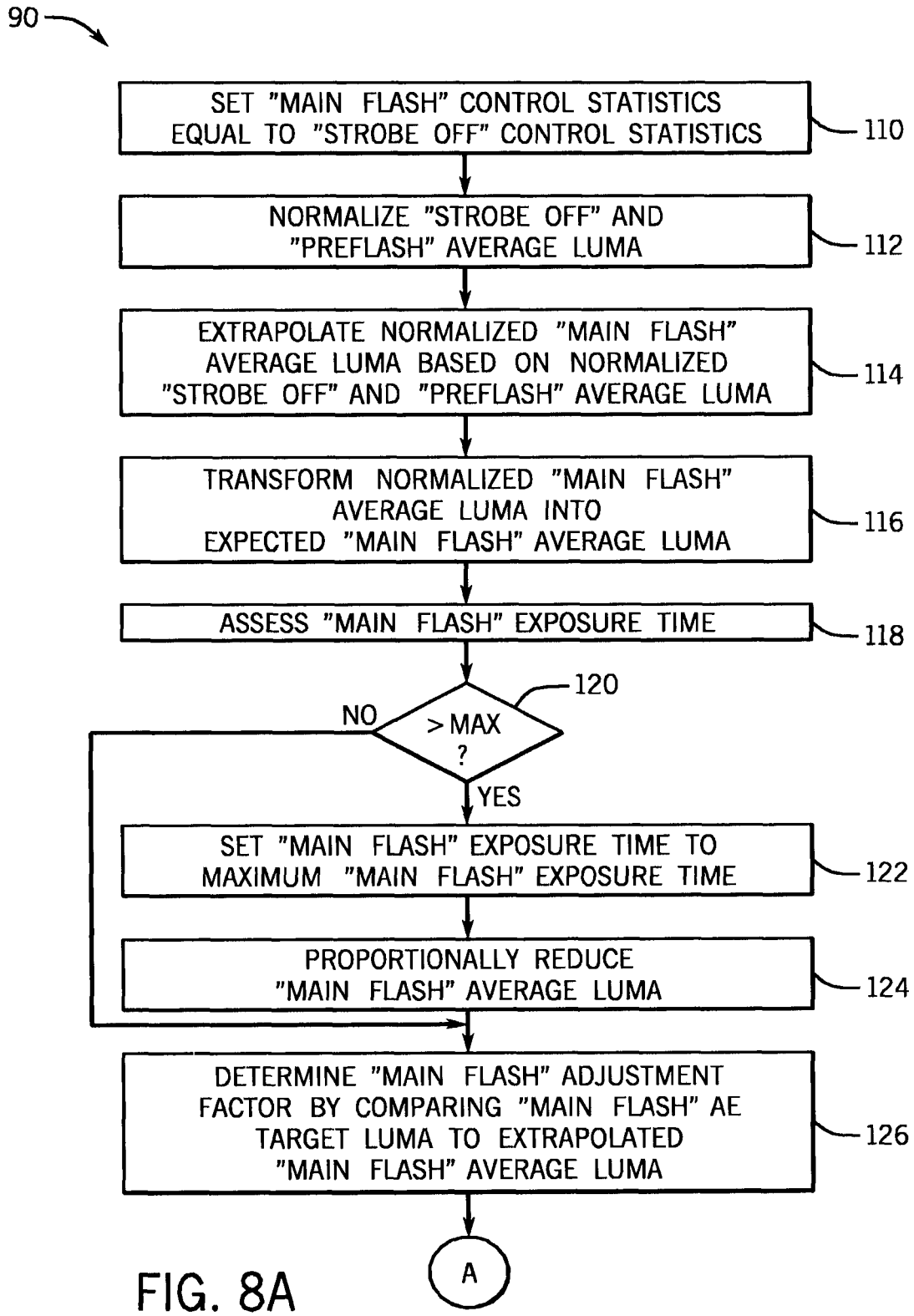
FIGS. 8A and 8B represent a flowchart describing an embodiment of a method for determining image capture control statistics for the proper exposure of a strobe-illuminated image in greater detail.
Figure 8B:
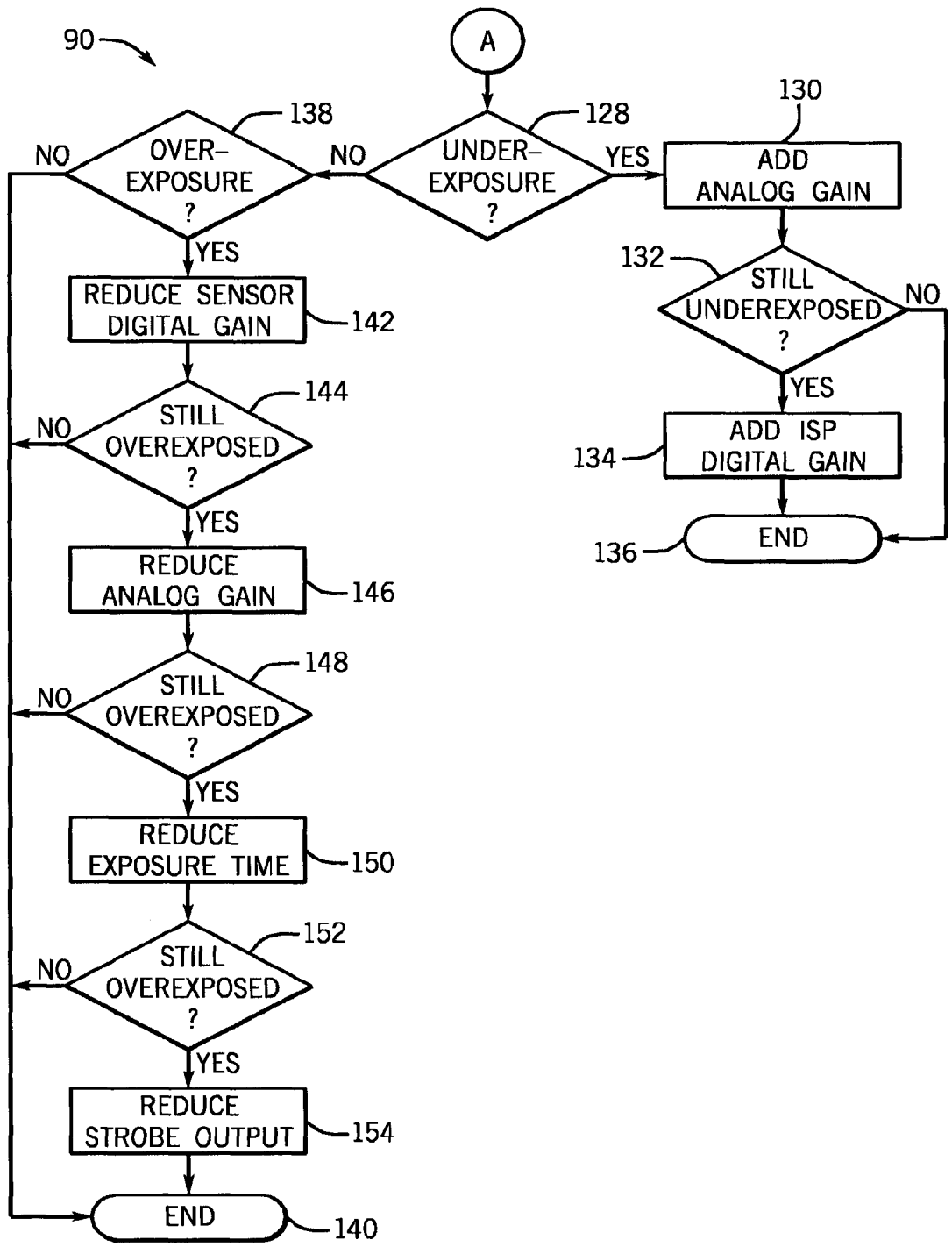

FIGS. 8A and 8B is a flowchart 90 that provides additional details describing one embodiment of the process for determining the "main flash" image capture control statistics 62-68, discussed above with reference to block 90 of FIG. 6 and the flowchart 90 of FIG. 7. The flowchart 90 of FIGS. 8A and 8B may begin when the "main flash" image capture control statistics 62-68 are initially set equal to the strobe off control statistics (block 110), as mentioned above. Additionally, the initial value of the "main flash" strobe 22 intensity may be determined to be proportional to the "preflash" strobe 22 intensity (e.g., equal to the "preflash" intensity multiplied by a certain gain).

Since the strobe off average luma 60 and the preflash average luma 60 statistics 56 are dependent on the control statistics 62-68 with which they are associated, the electronic device 10 may normalize both values to their respective control statistics (block 112). For example, the "strobe off" average luma 60 may be normalized to the "strobe off" exposure time 62, analog gain 64, sensor digital gain 66, and ISP digital gain 68, determined based on image data obtained while the strobe 22 is not emitting light. Similarly, the "preflash" average luma 60 may be normalized to the "preflash" exposure time 62, analog gain 64, sensor digital gain 66, and ISP digital gain 68, determined based on image data obtained while the strobe 22 is emitting the "preflash" amount of light.

From these normalized "strobe off" and "preflash" luma values, the electronic device 10 may extrapolate an expected normalized "main flash" average luma value (block 114). By way of background, it should be understood that the normalized "strobe off" average luma may represent the brightness of the scene 52 due to ambient light, independent of the "strobe off" image capture control statistics. Likewise, the normalized "preflash" average luma may represent the brightness of the scene 52 due to ambient light plus the "preflash" amount of light emitted by the strobe 22, independent of the "preflash" image capture control statistics. Thus, the normalized "strobe off" and "preflash" luma values may be directly compared to one another to determine what amount of the normalized "preflash" luma value is due to the "preflash" light emitted by the strobe 22. That is, subtracting the normalized "strobe off" luma value from the "preflash" luma value may provide a normalized luma component resulting entirely from the "preflash" light from the strobe 22.

The "main flash" light to be emitted by the strobe 22 during the "main flash" period may be proportional to the amount of "preflash" light emitted by the strobe 22 during the "preflash" period. Thus, the difference between the normalized "preflash" luma and the normalized "strobe off" luma (e.g., the normalized luma component due entirely to the "preflash" light emitted by the strobe 22) may be scaled up by the proportion between the "preflash" light and the "main flash" light to determine an expected normalized "main-flash-only" luma component. This expected normalized "main-flash-only" luma component may be due entirely to the "main flash" light to be emitted by the strobe 22 and may not arise from any of the ambient light.

Combining this expected normalized "main-flash-only" luma (due entirely to the "main flash" light to be emitted by the strobe 22) with the normalized "strobe off" luma (due entirely to ambient light) may result in an expected normalized "main flash" average luma, which may account for all of the light expected to illuminate the scene 52 during the "main flash" period. Here, it should be noted that a ratio of the expected normalized "main-flash-only" luma and the expected normalized "main flash" average luma may be used for a white balance (WB). Specifically, the ratio of the expected normalized "main-flash-only" luma to the expected normalized "main flash" average luma may indicate the proportional effect of the strobe on the color temperature of the scene 52.

To transform the expected normalized "main flash" average luma into an expected "main flash" average luma 60, the expected normalized "main flash" average luma may be denormalized based on the initial values of the "main flash" image capture control statistics (block 116). This expected "main flash" average luma 60 determined at block 116 may represent the average luma that would be expected if the "main flash" image were captured using the initial values of the "main flash" image capture control statistics 62-68.

The expected "main flash" average luma 60 may represent an unrealistic amount of brightness if the initial value of the "main flash" exposure time 62 exceeds a maximum value. As such, the electronic device may assess the "main flash" exposure time 62 (block 118) and, if the "main flash" exposure time 62 is greater than the maximum allowed exposure time for the strobe sequence (decision block 120), the "main flash" exposure time 62 may be reduced to that maximum value (block 122). Since changing the "main flash" exposure time 62 would impact the amount of light collected by the image capture circuitry 20, the expected "main flash" average luma should change accordingly. Therefore, the "main flash" average luma 60 may be proportionally reduced based on a ratio of the new value of the "main flash" exposure time 62 to the initial value of the "main flash" exposure time 62 (block 124). If the "main flash" exposure time 62 is less than the maximum allowed (decision block 120), blocks 122 and 124 may be skipped and the expected "main flash" average luma 60 may be unchanged.

To ascertain the "main flash" image capture control statistics 62-68 that will properly expose an image of the scene 52 during the "main flash" period, the expected "main flash" average luma 60 may be compared to a "main flash" autoexposure (AE) target luma (block 126). Doing so may produce an exposure adjustment factor that may indicate whether the current values of the "main flash" image capture control statistics 62-68 are expected to produce a properly exposed, an underexposed, or an overexposed image. It should be appreciated that the "main flash" AE target luma may be greater than a "strobe off" AE target.

This comparison of the expected "main flash" average luma 60 to the "main flash" autoexposure (AE) target luma may be used to correct the control statistics 62-68 and 72 to correct for expected underexposure or overexposure. For example, in certain situations, a user may constrain certain control statistics 62-68 that could cause underexposure. By way of example, the "strobe off" and "preflash" exposure time 62 may have been $\frac{1}{10}$ sec. To minimize camera shake, the user may constrain the exposure time 62 to $\frac{1}{30}$ instead. Thus, when such situations occur, and the current values of the "main flash" image capture control statistics 62-68 are expected to produce an underexposed image (decision block 128), the analog gain 64 may be increased (block 130). Particularly, the analog gain 64 first may be increased by an amount sufficient to produce a properly exposed image or, if that is not possible, the analog gain 64 may be increased to a certain maximum desired value that is expected to cause the image to be less underexposed. If the image is no longer expected to be underexposed (decision block 132), the flowchart 90 may end (block 136), and the "main flash" image capture of block 92 of FIG. 6 may take place according to the "main flash" image capture control statistics 62-68.

If, despite adding the analog gain 64 at block 130, the image is still expected to be underexposed (decision block 132), the image signal processor (ISP) digital gain 68 may be increased (block 134). As with the analog gain 64, the ISP digital gain 68 may be increased by an amount sufficient to produce a properly exposed image or, if that is not possible, the ISP digital gain 68 may be increased to a certain maximum desired value that is expected to cause the image to be less underexposed. Having at least partially corrected the "main flash" image capture control statistics 64 and 68 to achieve an expected proper exposure, the flowchart 90 may end (block 136), and the "main flash" image capture of block 92 of FIG. 6 may take place according to the "main flash" image capture control statistics 62-68.

Returning to decision block 128, if the current values of the "main flash" image capture control statistics 62-68 are not expected to produce an underexposed image, the image processing 24 and/or other data processing circuitry may consider whether the current values of the "main flash" image capture control statistics 62-68 are expected to produce an overexposed image (decision block 138). If not, the image may be expected to be properly exposed and the flowchart 90 may end (block 140). Thereafter, the "main flash" image capture of block 92 of FIG. 6 may take place according to the current values of the "main flash" image capture control statistics 62-68.

If the current values of the "main flash" image capture control statistics 62-68 are expected to produce an overexposed image (decision block 138), the sensor digital gain 66 may be reduced (block 142). Specifically, the sensor digital gain 66 may be reduced by an amount sufficient to produce a properly exposed image or, if that is not possible, the sensor digital gain 66 may be reduced to a certain minimum desired value that is expected to cause the image to be less overexposed. Thereafter, if the image is no longer expected to be overexposed (decision block 144), the flowchart 90 may end (block 140), and the "main flash" image capture of block 92 of FIG. 6 may take place according to the "main flash" image capture control statistics 62-68.

If, despite reducing the sensor digital gain 66 at block 142, the image is still expected to be overexposed (decision block 144), the analog gain 64 may be reduced (block 146). As with the sensor digital gain 66, the analog gain 64 may be reduced by an amount sufficient to produce a properly exposed image or, if that is not possible, the analog gain 64 may be reduced to a certain minimum desired value that is expected to cause the image to be less overexposed. Thereafter, if the image is no longer expected to be overexposed (decision block 148), the flowchart 90 may end (block 140), and the "main flash" image capture of block 92 of FIG. 6 may take place according to the "main flash" image capture control statistics 62-68.

If, despite reducing the analog gain 64 at block 146, the image is still expected to be overexposed (decision block 148), the exposure time 62 may be reduced (block 150). As with the analog gain 64, the exposure time 62 may be reduced by an amount sufficient to produce a properly exposed image or, if that is not possible, the exposure time 62 may be reduced to a certain minimum desired value that is expected to cause the image to be less overexposed. Thereafter, if the image is no longer expected to be overexposed (decision block 152), the flowchart 90 may end (block 140), and the "main flash" image capture of block 92 of FIG. 6 may take place according to the "main flash" image capture control statistics 62-68.

Finally, if the reductions of the sensor digital gain 66, the analog gain 64, and the exposure time 62 are not enough to produce a properly exposed image and the image is still expected to be overexposed (decision block 152), the intensity of the "main flash" strobe 22 output may be reduced from its initial value. The "main flash" strobe 22 intensity may be reduced by an amount sufficient to produce a properly exposed image or, if that is not possible, it may be reduced to a certain minimum desired value that is expected to cause the image to be less overexposed. Having at least partially corrected the expected exposure of the image during the "main flash" period, the flowchart 90 may end (block 136), and the "main flash" image capture of block 92 of FIG. 6 may take place according to the "main flash" image capture control statistics 62-68 and the new value of the "main flash" strobe 22 intensity.

Figure 9:
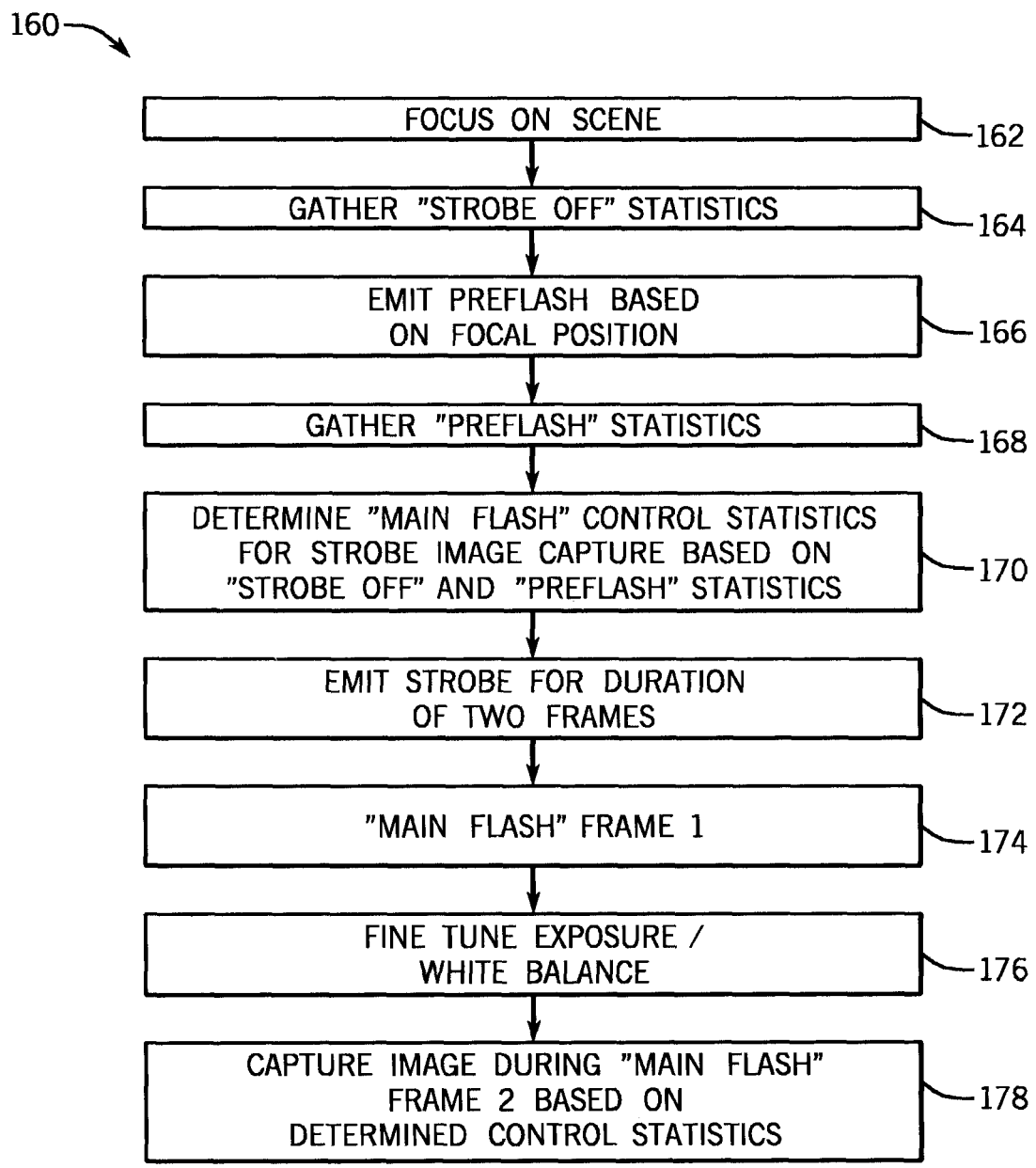
FIG. 9 is a flowchart describing an embodiment of a method for obtaining a properly exposed strobe-illuminated image using statistics captured during a preflash sequence and during a first frame of a main flash sequence.

In some embodiments, the control statistics 62-68 and/or 72 for the capture of the final image may be further refined during the "main flash" period. In particular, as shown by a flowchart 160 of FIG. 9, the strobe 22 may emit the "main flash" for the duration of at least two frames, of which the first frame may provide a basis for modifying the control statistics 62-68 and 72 used to capture an image during the second frame.

The flowchart 160 may begin when the image capture circuitry 20 focuses on a subject in the scene 52 (block 162). Next, the image capture controller 78 and/or other data processing circuitry (e.g., the processor(s) 12) may gather certain "strobe off" image capture statistics 56 obtained by the statistics engine 74 while the strobe 22 is not emitting light (block 164). These "strobe off" image capture statistics 56 may include, for example, the focus position 58, the average luma 60, the exposure time 62, the analog gain 64, the sensor digital 66, the image signal processor (ISP) digital gain 68, and the color temperature 70.

Based on the focus position 58 gathered at block 164, the image capture controller 78 and/or other data processing circuitry may cause the strobe 22 to emit a "preflash" amount of light onto the scene 52. The "preflash" amount of light may be determined, for example, based on a lookup table or formula relating the focus point 58 to a certain strobe current. In other embodiments, it should be understood that the "preflash" amount of light emitted by the strobe 22 may not depend upon the focus point 58, but may be, for example, a certain constant amount. Generally, in either case, the amount of light emitted at block 166 may be less than the amount of light emitted by the strobe 22 during a "main flash" period, as described below. However, in other embodiments, the amount of light emitted at block 166 may be equal to or more than the amount of light emitted by the strobe 22 during the "main flash" period.

Next, the statistics engine 74 may determine "preflash" image capture statistics 56 using image data obtained by the image capture circuitry 20 while the "preflash" amount of light is being emitted by the strobe 22, certain of which may be gathered by the image capture controller 78 and/or other data processing circuitry (block 168). These certain "preflash" image capture statistics 56 may include, for example, the average luma 60, the exposure time 62, the analog gain 64, the sensor digital gain 66, and the image signal processor (ISP) digital gain 68.

The "strobe off" and "preflash" image capture statistics 56 may be used to extrapolate the impact of a "main flash" strobe illumination on the scene 52, which then may be used to determine certain "main flash" image capture control statistics 62-68 to be employed during a "main flash" period (block 170). In some embodiments, the certain "strobe off" and "preflash" image capture statistics 56 also may be used to determine the intensity of a "main flash" to be emitted by the strobe 22. That is, the occurrences of block 170 may be the same as those of block 90 of FIG. 5, such as discussed above with reference to FIGS. 6, 7, 8A, and 8B.

Thereafter, the strobe 22 may emit light at the determined intensity for a duration of two frames of a "main flash" period (block 172). In some embodiments, this "main flash" period may take place after a suitable amount of time has passed since the "preflash" period to reduce red-eye effects in images of people. From image data obtained during a first frame of the "main flash" period, the statistics engine 74 may determine "main flash" frame 1 image capture statistics 56, certain of which may be gathered by the image capture controller 78 and/or other data processing circuitry (block 174). These "main flash" frame 1 image capture statistics 56 may include, for example, the average luma 60, the exposure time 62, the analog gain 64, the sensor digital gain 66, and the image signal processor (ISP) digital gain 68.

While the "preflash" image capture control statistics 56 relative to the "strobe off" image capture control statistics 56 may be used to more closely approach an optimal exposure, estimate error can still occur. Thus, the "main flash" frame 1 image capture statistics 56 may be used to fine tune certain image capture control statistics 62-68 and/or 72 (block 176). For example, the "main flash" frame 1 image capture statistics 56 may enable the fine tuning of certain exposure-controlling image capture control statistics 62-68, such as the sensor digital gain 66 or the image signal processor (ISP) digital gain 68. By way of example, if the "main flash" frame 1 image capture statistics 56 indicate a slight underexposure, the "main flash" sensor digital gain 66 or the image signal processor (ISP) digital gain 68 may be increased slightly. Likewise, if the "main flash" frame 1 image capture statistics 56 indicate a slight overexposure, the "main flash" sensor digital gain 66 or the image signal processor (ISP) digital gain 68 may be decreased slightly.

In addition, when a large quantity of the illumination of the scene 52 is due to light from the strobe 22, the specific color temperature of the strobe 22 may more significantly impact the white balancing decision making that should take place. The effect of the additional light from the strobe 22 may be problematic in processing a final image because different strobes 22 may have different unit-to-unit manufactory color temperature variations. In particular, since it may not be possible to know the precise value of the color temperature of the strobe 22 at the time of manufacturing, the "strobe off," "preflash," and/or "main flash" frame 1 color temperatures 72 may be compared to adjust the final "main flash" white balancing parameters. That is, by comparing the changes in the color temperature 72 statistics collected at the various periods as additional strobe 22 illumination is added to the scene 52, one may better ascertain the particular color temperature contribution of the strobe 22. Thereafter, the "main flash" white balancing parameters may be adjusted, reducing white balancing error caused by unit-to-unit strobe 22 color variation. After the "main flash" image capture control statistics 62-68 and/or 72 have been fine tuned in block 176, the second frame of the "main flash" period may be obtained (block 178).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
gathering, using data processing circuitry, first image capture statistics based at least in part on first image data captured by image capture circuitry while a strobe is not emitting light;
emitting a preflash using the strobe;
gathering, using the data processing circuitry, second image capture statistics based at least in part on second image data captured by the image capture circuitry while the preflash is being emitted;
determining, using the data processing circuitry, first main flash control statistics based at least in part on the first image capture statistics and the second image capture statistics;
emitting a main flash using the strobe, wherein the main flash is configured to endure across at least two frames of image data captured by the image capture circuitry;
capturing, using the image capture circuitry, a first main flash frame of image data while the strobe is emitting the main flash, based at least in part on the first main flash control statistics;
gathering, using the data processing circuitry, third image capture statistics based at least in part on the first main flash frame of image data;
determining, using the data processing circuitry, second main flash control statistics based at least in part on the third image capture statistics; and
capturing, using the image capture circuitry, an image based at least in part on the second main flash control statistics while the strobe is emitting the main flash.

2. The method of claim 1, wherein determining the second main flash control statistics comprises increasing a digital gain of the first main flash control statistics when the third image capture statistics indicate underexposure.

3. The method of claim 1, wherein determining the second main flash control statistics comprises decreasing a digital gain of the first main flash control statistics when the third age capture statistics indicate overexposure.

4. The method of claim 1, comprising determining a white balance adjustment based at least in part a comparison between a first color temperature associated with the first image capture statistics, a second color temperature associated with the second image capture statistics, and a third color temperature associated with the third image capture statistics.

5. A machine readable non-transitory storage medium storing instructions which when executed by a data processing system cause the system to perform a method comprising:
gathering, using the data processing system, first image capture statistics based at least in part on first image data captured by image capture circuitry while a strobe is not emitting light;
emitting a preflash using the strobe;
gathering second image capture statistics based at least in part on second image data captured by the image capture circuitry while the preflash is being emitted;
determining first main flash control statistics based at least in part on the first image capture statistics and the second image capture statistics;
emitting a main flash using the strobe, wherein the main flash is configured to endure across at least two frames of image data captured by the image capture circuitry;
capturing, using the image capture circuitry, a first main flash frame of image data while the strobe is emitting the main flash, based at least in part on the first main flash control statistics;
gathering third image capture statistics based at least in part on the first main flash frame of image data;
determining second main flash control statistics based at least in part on the third image capture statistics; and
capturing an image based at least in part on the second main flash control statistics while the strobe is emitting the main flash.

6. The medium of claim 5, wherein determining the second main flash control statistics comprises increasing a digital gain of the first main flash control statistics when the third image capture statistics indicate underexposure.

7. The medium of claim 5, wherein determining the second main flash control statistics comprises decreasing a digital gain of the first main flash control statistics when the third image capture statistics indicate overexposure.

8. The medium of claim 5, comprising determining a white balance adjustment based at least in part a comparison between a first color temperature associated with the first image capture statistics, a second color temperature associated with the second image capture statistics, and a third color temperature associated with the third image capture statistics.

9. A system comprising:
a strobe;
an image capture circuitry;
a processing system coupled to the strobe and to the image capture circuitry, wherein the processing system is configured to:
gather first image capture statistics based at least in part on first image data captured by the image capture circuitry while the strobe is not emitting light;
cause the strobe to emit a preflash using the strobe;
gather second image capture statistics based at least in part on second image data captured by the image capture circuitry while the preflash is being emitted;
determine first main flash control statistics based at least in part on the first image capture statistics and the second image capture statistics;
cause the strobe to emit a main flash using the strobe, wherein the main flash is configured to endure across at least two frames of image data captured by the image capture circuitry;
capture using the image capture circuitry, a first main flash frame of image data while the strobe is emitting the main flash, based at least in part on the first main flash control statistics;
gather third image capture statistics based at least in part on the first main flash frame of image data;
determine second main flash control statistics based at least in part on the third image capture statistics; and
capture, using the image capture circuitry, an image based at least in part on the second main flash control statistics while the strobe is emitting the main flash.

10. The system of claim 9, wherein the processing system is configured to determine the second main flash control statistics by increasing a digital gain of the first main flash control statistics when the third image capture statistics indicate underexposure.

11. The system of claim 9, wherein the processing system is configured to determine the second main flash control statistics by decreasing a digital gain of the first main flash control statistics when the third image capture statistics indicate overexposure.

12. The system of claim 9, wherein the processing system is configured to determine a white balance adjustment based at least in part a comparison between a first color temperature associated with the first image capture statistics, a second color temperature associated with the second image capture statistics, and a third color temperature associated with the third image capture statistics.

* * * * *